United States Patent
Bi et al.

(10) Patent No.: US 10,103,977 B2
(45) Date of Patent: Oct. 16, 2018

(54) DATA FLOW DISTRIBUTION METHOD AND CONTROLLER

(71) Applicant: ZTE Corporation, Shenzhen (CN)

(72) Inventors: Yifeng Bi, Shenzhen (CN); Jing Wang, Shenzhen (CN); Tian Tian, Shenzhen (CN); Jun Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 95 days.

(21) Appl. No.: 15/036,877

(22) PCT Filed: May 30, 2014

(86) PCT No.: PCT/CN2014/079004
§ 371 (c)(1),
(2) Date: May 16, 2016

(87) PCT Pub. No.: WO2015/070592
PCT Pub. Date: May 21, 2015

(65) Prior Publication Data
US 2016/0294682 A1     Oct. 6, 2016

(30) Foreign Application Priority Data
Nov. 14, 2013   (CN) .......................... 2013 1 0567982

(51) Int. Cl.
*H04L 12/721*     (2013.01)
*H04W 76/10*     (2018.01)
(Continued)

(52) U.S. Cl.
CPC ............ *H04L 45/38* (2013.01); *H04L 41/083* (2013.01); *H04L 41/5054* (2013.01);
(Continued)

(58) Field of Classification Search
CPC ... H04L 45/38; H04L 41/083; H04L 41/5054; H04L 45/64; H04L 61/256; H04W 76/02; H04W 88/16; H04W 76/10
(Continued)

(56) References Cited

U.S. PATENT DOCUMENTS

| | | | |
|---|---|---|---|
| 8,817,625 B1* | 8/2014 | Zhang | H04Q 3/0029 370/235 |
| 2013/0223442 A1* | 8/2013 | Narayanan | H04L 45/64 370/389 |
| 2016/0099874 A1* | 4/2016 | Hu | H04L 12/6418 370/236 |

FOREIGN PATENT DOCUMENTS

| CN | 102244899 A | 11/2011 |
|---|---|---|
| CN | 102801603 A | 11/2012 |

(Continued)

OTHER PUBLICATIONS

International Search Report for corresponding application PCT/CN2014/079004 filed on May 30, 2014; dated Aug. 25, 2014.
(Continued)

*Primary Examiner* — Obaidul Huq
(74) *Attorney, Agent, or Firm* — Cantor Colburn LLP

(57) ABSTRACT

Provided are a data flow distribution method and a controller. The method includes: a software defined network (SDN) controller acquiring data flow description information of a data flow; and the SDN controller deciding, according to the data flow description information, whether the data flow needs distribution, and when the data flow needs the distribution, delivering a distribution rule flow table to a distribution gateway. By using the technical solutions, application/service data flow based distribution is implemented. Compared with the related art that distribution is implemented based on a PDN connection and based on a bearer, the technical solutions implement finer-granularity distribution, and improve experience of users and competition of operators.

18 Claims, 10 Drawing Sheets

(51) Int. Cl.
*H04L 12/715* (2013.01)
*H04L 29/12* (2006.01)
*H04L 12/24* (2006.01)
*H04W 88/16* (2009.01)

(52) U.S. Cl.
CPC ............ *H04L 45/64* (2013.01); *H04L 61/256* (2013.01); *H04W 76/10* (2018.02); *H04W 88/16* (2013.01)

(58) Field of Classification Search
USPC ................................................ 370/229, 235
See application file for complete search history.

(56) References Cited

FOREIGN PATENT DOCUMENTS

CN        102821165 A     12/2012
WO     2013143611 A1     10/2013

OTHER PUBLICATIONS

European Search Report for corresponding application EP 14 86 1533; Report dated Oct. 21, 2016.
Internet Citation, "Split Architecture for Large Scale Wide Area Networks—Deliverable D3.3 ED Wolfgang John", Aug. 2012, pp. 1-129, Retrieved from the Internet: URL: http://www.fp7-sparc.eu/assets/deliverables/SPARC_D3.3_Split_Architecture_for_Large_Scale_Wide_Area_Networks.pdf, XP002701201.
Li Erran Li, et al., "Toward Software-Defined Cellular Networks", Software Defined Networking, Oct. 25, 2012, pp. 7-12, XP032283462.
Shaohua Yu Wuyan Research Ins of Posts and Telecoms China, "Supplement on Application Scenarios Using Deep Packet Inspection in Support of Service/Application Awareness in Evolving Networks", vol. 7/13, Nov. 13, 2013, pp. 1-27, XP044070946.
Suneth Namal, et al., "Architectural EPC extensions for supporting heterogeneous mobility schemes", Jan. 31, 2013, pp. 1-93, Retrieved from Internet: URL http://www.mevico.org/D22.pdf.

* cited by examiner

DATA FLOW DISTRIBUTION METHOD AND CONTROLLER

TECHNICAL FIELD

The present disclosure relates to the field of mobile communications, and in particular to a data flow distribution method and a controller.

BACKGROUND

In a related art, the OpenFlow protocol, proposed in 2008 by the Stanford University, is a protocol which separates the control from the forwarding. An external control plane entity uses the OpenFlow protocol to control a forwarding plane device to realize various forwarding logics, and the forwarding plane device mainly performs a controlled forwarding according to a flow table sent by an OpenFlow controller. The OpenFlow protocol further evolves to become a Software Defined Network (SDN) technology, i.e., various complex network applications can be achieved under a control plane using software programming, for example, an Evolved Packet System (EPS)/General Packet Radio Service (GPRS) network can be achieved using the SDN, wherein the EPS network is a fourth generation mobile communication network defined by the 3rd Generation Partnership Project (3GPP), and the GPRS network is the third generation mobile communication network defined by the 3GPP.

An architecture realizing the EPS/GPRS network using the SDN is as shown in FIG. 1. In FIG. 1, UE is a communication terminal; an Evolved Universal Terrestrial Radio Access Network (E-UTRAN) is a wireless access network part, wherein the E-UTRAN is composed of evolved NodeBs (eNodeBs). The core network part is a software-defined Evolved Packet Core (EPC, i.e., the core network part of the EPS) network, all the Unified Gateways (UGW) are universal gateway devices, and the roles thereof are controlled by a control signalling of an SDN Controller (Controller or controller). As shown in FIG. 1, a UGW where a Serving Gateway (SGW) or a Serving GPRS Support Node (SGSN) is located functions as the SGW or the SGSN according to an indication of the controller, a UGW where a Packet Data Network Gateway (PGW) or a Gateway GPRS Support Node (GGSN) is located functions as the PGW or the GGSN according to an indication of the Controller, and similarly, another UGW functions as a non-3GPP access gateway or an Evolved Packet Data Gateway (ePDG). It is not precluded that two, three or more network element roles fall on one UGW, if they fall on one UGW, the interfaces among the network elements become internal interfaces. In fact, the SGW, the PGW, the GGSN, the SGSN, the ePDG, the non-3GPP access gateway and the like which are controlled by indications of the controller all perform user plane functions of corresponding mobile network gateways in the existing GRPS system and EPC system, while the control plane functions thereof are all integrated in the Controller. The Controller is responsible for the selection of a gateway (PGW/UGW, SGW/UGW, SGSN/UGW, GGSN/UGW) during a user access, and the Controller needs to consider constraint conditions such as subscription information and position information of the UE when selecting a UGW. For example, if the subscription of the UE allows a service to be distributed in the neighbourhood, the Controller selects for the UE a UGW which is close to the access point of the UE in terms of topology or address location to serve as the SGW/PGW/SGSN/GGSN, etc. In addition, the Controller is also responsible for the address management function of a subscribed user, including user address distribution, recycling, application for agency, external announcement, etc. The Controller allocates an address for the UE, designates a UGW which manages the address, and announces the UGW which is responsible for the address to an external router, and in this way, downlink data can be accurately routed to an appropriate UGW. Second, the Controller has a communication interface with the data centre, for example, a Deep packet inspection (DPI) and other functional modules, to enable the information interaction through an Xy interface, wherein the Xy interface is pronoun which only indicates that there is an interface used for the information feedback, while the name of the interface, a protocol adopted by the interface and a manner for the interface to feedback information are not determined.

According to the protocol defined by the present 3GPP standard organization for the EPS system and the GPRS system, the data communicates with the external PDN network or Internet through the PGW. However, such a routing method faces a problem that in the present network, the position of the PGW is relatively high, for some service data such as an internet service, the serious data circuitry and the waste of bandwidth resources will be caused by the fact that a large number of service data packets are routed to the PGW at a very high position. For such a problem, 3GPP also proposes some solutions, for example: 1, the position of the PGW in the network architecture is lowered (i.e., deploying the PGW in a distribution manner); or 2, the SGW/PGW which is close to the access point of the UE is selected when the UE accesses the network; or 3, a local gateway is deployed on a base station; or 4, a distribution gateway at a position close to the base station is selected to perform distribution via address translation, etc. The above distribution solutions can also be achieved in the EPS/GPRS network based on the SDN under the control of the Controller. However, the above solutions have the following defects: Solutions 1-3 are distribution based on PDN connection, that is to say, the UE establishes a PDN connection which corresponds to one IP address, all the services using the IP address/PDN connection must be entirely distributed or not distributed at all, but it cannot be achieved that the data flows of one part of applications using the IP address are distributed, while the data flows of the other part of applications using the IP address are not distributed. This is a defect for a terminal which only supports one IP address. For a terminal which supports multiple IP addresses, the simultaneous operation of applications under distribution and those not under distribution can be supported only when the multiple IP addresses are used, which is also a waste for the use of IP addresses. Solution 4 uses the network address translation (NAT) technology to distribute the service of a GPRS system based on the granularity of bearers, however, the technology is only suitable for the GPRS system but is not suitable for an EPS system, as an additional encryption technique is performed on the control signalling of the EPS. Furthermore, although solution 4 has finer-granularity distribution than solutions 1-3, the data distribution under the granularity of applications still cannot be achieved.

The distribution technology having the above-mentioned detects is disadvantageous not only for the user experience but also for the improvement of the competition of operators. Therefore, an application/service data flow granularity based data flow distribution technology is in urgent need at present.

SUMMARY

In view of the above-mentioned problems of the serious data circuitry and the waste of bandwidth resources caused by the fact that the position of the PGW is relatively high, the embodiments of the present disclosure are proposed to provide a data flow distribution method and a controller to overcome the above-mentioned problems.

A data flow distribution method is provided in an embodiment of the present disclosure, including: acquiring, by a software defined network (SDN) controller, data flow description information of a data flow; and deciding, by the SDN controller according to the data flow description information, whether the data flow needs a distribution, and when the data flow needs the distribution, delivering a distribution rule flow table to a distribution gateway.

A controller is provided in an embodiment of the present disclosure, including: an acquisition component, configured to acquire data flow description information of a data flow; and a processing component, configured to decide, according to the data flow description information, whether the data flow needs a distribution, and when the data flow needs the distribution, deliver a distribution rule flow table to a distribution gateway.

The embodiments of the present disclosure have the following beneficial effects:

By means of the embodiments of the present disclosure of delivering a distribution rule flow table to a data flow needing distribution according to the acquired data flow description information, the problems in the related technologies that the serious data circuitry and the waste of bandwidth resources of the backbone network are caused by the fact that the position of the PGW is relatively high are solved, and the application/service data flow based distribution is implemented. Compared with the related art that distribution is implemented based on a PDN connection and based on a bearer, the technical solutions in embodiments of the present disclosure implement finer-granularity distribution, and improve experience of users and competition of operators.

The above description is only a summary of the technical solutions of the embodiments of the present disclosure, in order to be able to understand the technical means of the present disclosure more clearly, the technical means can be implemented according to the contents of the description, furthermore, to make the above-mentioned contents and other objectives, characteristics, and advantages of the present disclosure more comprehensible, specific embodiments of the present disclosure are descried as follows in detail.

DESCRIPTION OF THE DRAWINGS

Various other advantages or benefits will become clearer to those of ordinary skill in the art by reading the detailed description of the example implementations below. The figures depict for purposes of example implementations only, and shall not be considered as limiting of the present disclosure. Furthermore, the same reference numerals denote the same elements throughout the figures. In the drawings.

DETAILED DESCRIPTION OF EMBODIMENTS

Exemplary embodiments of the present disclosure will now be described in more detail, hereinafter referring to the accompanying drawings. Although the exemplary embodiments of the present disclosure are shown in the accompanying drawings, it should be understood that the present disclosure may be embodied in various forms and should not be construed as limited to the embodiments set forth herein. In contrast, these embodiments are provided for a more thorough understanding of the present disclosure and fully conveying the scope of the present disclosure to those skilled in the art.

In order to solve the problems in the related technologies that the serious data circuitry and the waste of bandwidth resources of the backbone network are caused by the fact that the position of the PGW is relatively high, a data flow distribution method and a controller are provided in the present disclosure, specifically, an SDN controller acquires data flow characteristics, generates a flow table carrying a distribution rule according to the data flow characteristics and a distribution strategy, and delivers the flow table to a distribution gateway; and the distribution gateway performs a distribution operation according to the flow table, that is, the data flow distributed is directly delivered to the external network from a distribution network. In the embodiments of the present disclosure, the SDN controller may send a data flow needing detection to the DPI for data flow characteristic detection, besides detecting the data flow characteristics and feeding back same to the SDN controller, the DPI detects also performs operations according to the indications of the SDN controller, including, but not limited to: first packet redirection, first packet feedback and negotiation signalling processing.

The present disclosure is further described in details below with reference to the accompany drawings and embodiments. It should be understood that specific embodiments described here are only used for illustrating the disclosure and not intended to limit the present disclosure.

METHOD EXAMPLES

Figure 1:
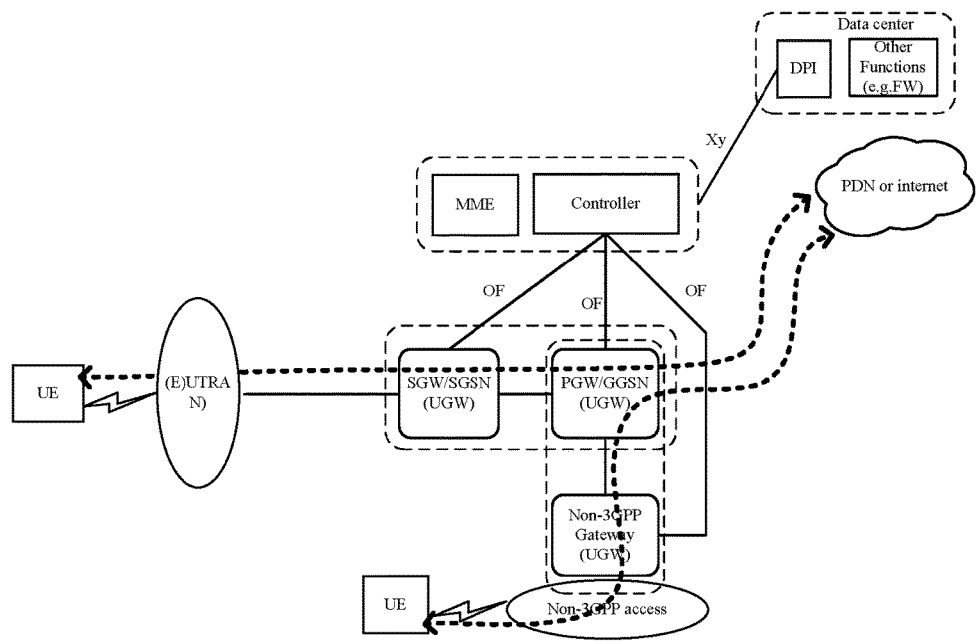
FIG. 1 is a schematic diagram of a software-defined EPS architecture and a data flow direction thereof in the related art.
Figure 2:
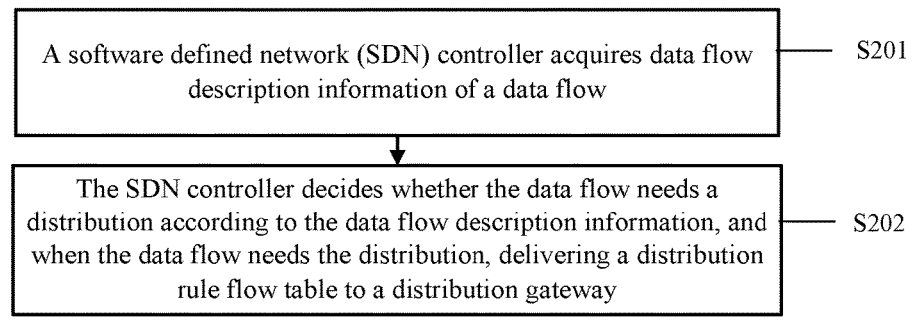
FIG. 2 is a flowchart of a data flow distribution method of the embodiments of the present disclosure.

According to the embodiments of the present disclosure, a data flow distribution method is provided, FIG. 2 is a flowchart of a data flow distribution method of the embodiments of the present disclosure, as shown in FIG. 2, the data flow distribution method according to the embodiments of the present disclosure includes the following processing:

Step 201, a software defined network (SDN) controller acquires data flow description information of a data flow; the measurement information includes at least one of: an application type of the data flow and quintuple information of the data flow.

In the embodiments of the present disclosure, in the process of terminal attachment/PDN connection establishment, the SDN controller selects a corresponding mobile network gateway and a corresponding distribution gateway for a terminal which at least establishes one PDN connection, the SDN controller sends a data flow table to a mobile network gateway and/or a distribution gateway before acquiring the data flow description information of the data flow, wherein the data flow table is used for indicating the mobile network gateway or the distribution gateway to send a data flow of a corresponding terminal to a Deep Packet Inspection (DPI) function for detection. The mobile network gateway includes one of: a user plane function of a SGW, a user plane function of a PGW, a user plane function of a SGSN, a user plane function of a GGSN or a user plane function of a non-3GPP gateway. The DPI is located at a data centre or located at a Traffic Detection Function (TDF).

After the above-mentioned processing, the DPI detects the data flow description information of the data flow and sends the acquired data flow description information to a software defined network (SDN) controller, the SDN controller acquires the data flow description information of the data flow from the DPI.

Step 202, the SDN controller decides whether the data flow needs a distribution according to the data flow description information, and when the data flow needs the distribution, delivering a distribution rule flow table to a distribution gateway.

Step 202 further includes the following processing: the SDN controller acquires a distribution strategy locally or from a strategy server, deciding, according to the data flow description information and the distribution strategy, whether the data flow corresponding to the data flow description information needs the distribution, and when it is decided that the data flow needs the distribution, generating the distribution rule flow table and delivering the distribution rule flow table to the distribution gateway.

Step 202 further includes the following processing: 1. The SDN controller acquires a preset distribution strategy from the local or from the strategy server, wherein the distribution strategy includes information of the application type of the data flow and whether the data flow needs to be distributed. 2. The SDN controller generate a distribution rule flow table according to the data flow description information and the distribution strategy, wherein the distribution rule flow table includes whether the data flow being the information needing to be distributed.

Finally, the distribution gateway distributes the corresponding data flow according to the distribution rule flow table.

The above-mentioned technical solution of the embodiments of the present disclosure is described in details below with reference to the embodiments.

Example 1

Figure 3:
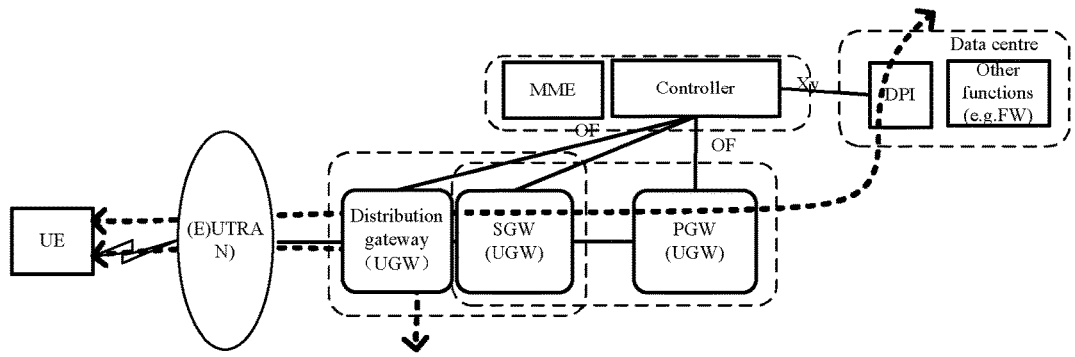
FIG. 3 is a schematic diagram of a data flow distribution method in a scenario in which a 3GPP access network accesses an EPS of the embodiments of the present disclosure.

The present embodiment describes a scenario in which a terminal accesses from the EUTRAN or UTRAN to the EPS core network EPC. As shown in FIG. 3, in the embodiment, the specific operation steps of the data flow distribution are provided below:

1) At least one PDN connection is established after the terminal UE is attached. The SDN controller selects a UGW for the PDN connection to execute the functions of the SGW and the PGW of the PDN connection, respectively.

2) In the process of attachment/PDN connection establishment, the SDN controller respectively delivers the data flow table on the distribution gateway, the SGW and the PGW, by means of the filtering of the flow table, all the first packets of the uplink data packets belonging to the PDN connection, or can reach the PGW/UGW, wherein the PGW/UGW forward the first packets of the data flows of all of or a part of the applications to the DPI of the data centre according to an indication operation delivered by the SDN controller to the PGW/UGW;

or are intercepted by the distribution gateway, wherein the data is redirected by the distribution gateway to the DPI or is sent by the distribution gateway to the DPI through the SDN controller.

In the EPS system, each PDN connection is one or a pair of IP address(es) of a corresponding terminal UE (a pair of IP addresses refers to IPv4 address+IPv6 address). Each PDN connection must have a default bearer which is also called as default bearer and also may have zero or a plurality of specific bearers.

The service data flows on a specific bearer all have fixed quintuple, the service on the specific bearer may be a data flow of an application and also may be data flows of a plurality of services, and the data flows of the application can operate on the same bearer as long as the QoS requirements of them are the same.

The service data flow on a default bearer may have the fixed quintuple and also may not have the fixed quintuple. That is to say, when the data packet is filtered on the default bearer, the filtering can be performed based on a TFT (a Traffic Flow Template for filtering the quintuple) and also can be based on a wildcard TFT. That is, all the data flows having no fixed TFT match may be filtered by a wildcard TFT to the default bearer.

The data flows, no matter they are on the specific bearer or on the default bearer, have a unified feature, i.e., the uplink data have the same source IP address and the downlink data have the same destination IP address. Therefore, the controller can make the SGW/PGW/UGW identify which data packets belong to which specific PDN connection and allow these data packets to be released to the next hop or reported to the DPI, etc.

The service data flows reported to the DPI may be all the data flows of the PDN connection, and also may be a part of the data flows of the PDN connection, and this is controlled by the SDN controller. For example, if the SDN controller is very clear about what applications the data flows corresponding to certain quintuple are, then this part of data flows does not need to be sent to the DPI to be detected at all; therefore, the SDN controller may notify the UGW/PGW or the distribution gateway that there is no need to send this part of data flows to the DPI. If the SDN controller is not clear about what applications the data flows corresponding to certain quintuple are, it is unclear whether this part of data flows needs to be distributed, and thus the SDN controller notifies the PGW/UGW or the distribution gateway to send this part of data flows to the DPI. In another case, if the SDN controller initially is not clear about what applications some type of data flows are and notifies the PGW/UGW or the distribution gateway to send the data flows to the DPI, after the DPI detection, the application types corresponding to the data flows are notified to the SDN controller, and the SDN controller is very clear about how to operate the data flows from now on, after this, the SDN controller does not need to control the PGW/UGW or the distribution gateway to resend this type of data flows to the DPI. In the most extreme and simple scenario, the SDN controller is unclear about the application corresponding to any data flow and requires the UGW/PGW or the distribution gateway to send all the data flows to the DPI, and the SDN controller later gradually adjusts according to the feedback of the DPI.

The above description is easy to be understood with respect to the uplink data, especially the operation forwarding or copying from the PGW/UGW or the distribution gateway to the DPI is very easy to be understood with respect to the uplink data. However, it needs to be further described with regard to the downlink data. There are many methods to ensure that packet inspection is performed on the downlink data via the DPI, although there is little relation between these operations and the present disclosure, the methods are described in order to make the reader understand more easily. One method is making a data packet reach the PGW/UGW or the distribution gateway in the existing manner, so that the PGW/UGW or the distribution gateway forwards the data packet to the DPI for deep packet inspection, and another method is ensuring that the downlink data reaching the PGW/UGW must pass through the data centre by network deployment, and this method has a high requirement to network deployment. The above two methods have both advantages and disadvantages, which is not repeated herein, and in a word, it is enough to ensure that DPI detection is performed on the data flow needing detection.

3) After receiving the data stream, the DPI performs deep packet inspection on the data packet, and the detected data stream characteristics, i.e., the data flow description information is fed back to the SDN controller through a feedback interface Xy interface.

The data flow description information includes but is not limited to the application type and quintuple information corresponding to the data stream.

4) The SDN controller makes a distribution rule according to the obtained data flow description information and combination strategy and delivers the flow table to the UGW where the distribution gateway is located for execution by the OpenFlow protocol.

The above-mentioned "combination strategy" refers to information acquired from the local or from the strategy server (such as PCRF, SPR or HSS, or AAA, or ADNSF), which information suggests or recommends which type of applications may be distributed, which type of applications cannot be distributed, etc. The SDN controller makes a distribution rule according to the acquired strategy in combination with the feedback of DPI, stipulating which type of applications may be distributed and which type of applications cannot be distributed, contains same in the flow table and delivers same to the distribution gateway.

The closer the distribution gateway is to the UGW of an access network side, the better the distribution gateway is. Generally, there are methods as follows: (1) The UGW where the SGW is locates serves as the distribution gateway. In such a scenario, the SDN controller can only carries the distribution rule in the flow table delivered to the SGW/UGW. (2) Other gateways are selected as the distribution gateways, such as the gateway which is between the EUTRAN and the UGW/SGW and is closer to the EUTRAN access network compared to the SGW. Such a gateway is fixedly arranged in general, because such a fixed arrangement can ensure that the data coming out/into the eNB of the EUTRAN must pass through the gateway. It also may be a gateway which is dynamically selected and is close to the eNB, this needs the SDN controller to have an explicit view of the network topology to ensure that the data flow of the PDN connection must be able to pass through the selected distribution gateway. The SDN controller can realize distribution by delivering the distribution rule to the gateway.

If the distribution gateway is a UGW which is different from the UGW where the SGW is located, the SDN controller selects the gateway when the SDN controller establishes the PDN connection, i.e., in the step of 1). After acquiring the distribution strategy, the SDN controller sends the distribution rule to the UGW where the distribution gateway is located by upgrading the flow table.

The distribution rule and the distribution technology corresponding to the distribution rule perform distribution in an address translation manner which is relatively mature. For ease of understanding, a brief description is provided herein. The NAT address translation is performed on the data packet on the distribution gateway, with regard to the uplink data, after the data packet reaches the distribution gateway, the original data packet is a data packet packaged with a GTP head, the distribution gateway removes the GTP head, the source IP address of the data flow in the GTP head is a mailing address of the UE, and the distribution gateway replaces the address with its own IP address and sends same. With regard to the downlink data reaching the distribution gateway, the data packet packets the distribution gateway address as a destination address, the distribution gateway replaces the address with the IP address of the UE, packets same on the GTP head, and then sends same to the eNB and finally to the UE. The above-mentioned mechanism is the most simple address translation mechanism, other relatively complex address translation mechanisms also may be used for distribution, and since the details of the mechanism have little relation with the embodiments of the present disclosure, it is not repeated herein.

5) After receiving the flow table carrying the distribution rule, the distribution gateway performs distribution on the data flow of a corresponding application according to the mechanism described in 4). The data flow not participating in distribution performs external routing by the PGW/UGW through an old path, as shown in FIG. 3.

Example 2

Figure 4:
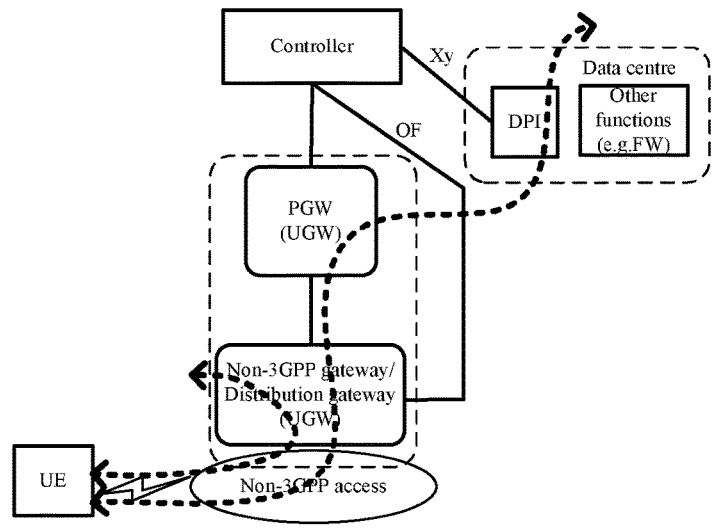
FIG. 4 is a schematic diagram of a data flow distribution method in a scenario in which a non-3GPP access network accesses an EPS of the embodiments of the present disclosure.

FIG. 4 is a schematic diagram of data flow distribution in a scenario in which a non-3GPP access network accesses an EPS of embodiment II of the present disclosure, the basic principle thereof is the same as that of embodiment I, and the difference thereof is described below.

The distribution network is a UGW where the non-3GPP access network is located, such as the HSGW of the CDMA access technology or the UGW where the BNG/BRAS/IP Edge/AC of the WLAN access technology, or a UGW which is between a base station and the access gateway, has been configured or is dynamically selected by the Controller and ensures that the data flow must be able to flow through.

The distribution gateway also executes a distribution mechanism based on NAT address translation, nevertheless, the GTP head is not removed/added herein, instead, the head is removed/added based on the corresponding access technology. For example, if a link between the UE and the access network is PPP, the distribution gateway removes and adds the PPP head while performing, and if the link is IPSec, the IPSec head needs to be removed and added, and the same operation is performed on other heads.

Embodiment III

Figure 5:
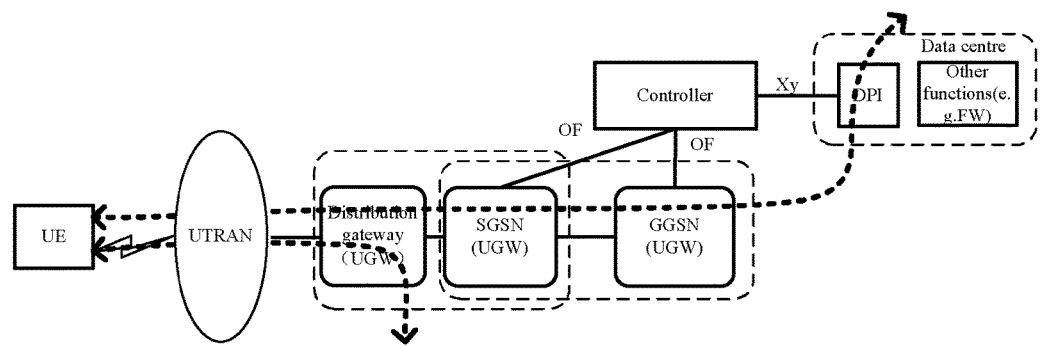
FIG. 5 is a schematic diagram of a data flow distribution method in a GPRS scenario of the embodiments of the present disclosure.

FIG. 5 is a schematic diagram of data flow distribution in a scenario in which a 3GPP access network accesses the GPRS of embodiment III of the present disclosure, the basic principle thereof is the same as that of embodiment I, and the difference thereof is described below.

The distribution network is a UGW where the 3GPP SGSN is located or a UGW which is between the RNC and the SGSN, has been configured or is dynamically selected by the Controller and ensures that the data flow must be able to flow through.

The distribution gateway also executes a distribution mechanism based on NAT address translation and also executes operations of removing/adding the GTP head and replacing the address, and the principle is the same as that of embodiment I.

The above-mentioned technical solution of the embodiments of the present disclosure is described with respect to the specificity of some applications:

I. In a case of an application of a first type, which is initiated by the terminal and of which the application type and the quintuple information are able to be acquired by detecting the first packet: the SDN controller receives an application type and quintuple information, wherein the application type and the quintuple information are sent by the DPI after the DPI receives and detects the first packet of negotiation; and the SDN controller decides whether the data flow needs the distribution according to the application type, the quintuple information and a distribution strategy, and when it is decided that the data flow needs the distribution, generating the distribution rule flow table and delivering the distribution rule flow table to the distribution gateway, wherein the data flow includes: the first packet, one or more data packets used by subsequent negotiation signalling and one or more pure data packets after application layer negotiation is completed.

Before the above-mentioned processing, the SDN controller sends a data flow table to the mobile network gateway and/or the distribution gateway, wherein the data flow table sent to the distribution gateway enables the distribution gateway to intercept the first packet when a terminal application is initiated, and sends, after backup caching is performed or not performed on the first packet, the first packet to the DPI through one of the following paths:

a first path: from the distribution gateway to the SDN controller and further to the DPI;

a second path: from the distribution gateway to the SGW/SGSN/non-3GPP gateway to the PGW/GGSN and further to the DPI; and a third path: from the distribution gateway to the DPI.

when the distribution gateway does not perform backup cache on the first packet, send indication information to the DPI to indicate the DPI to redirect the first packet to the distribution gateway or indicate the DPI to return the first packet to the distribution gateway through the SDN controller.

In practical application, the method further includes the following processing:

Step 1, after receiving the first packet of the negotiation initiated by the terminal, the deep packet inspection (DPI) function detects the data flow characteristics of the first packet, acquires the data flow description information of the first packet and sends the data flow description information of the first packet to the SDN controller through a specific interface;

Step 2, the SDN controller generates a distribution rule flow table according to the data flow description information and the preset distribution strategy, wherein the generated distribution rule flow table includes information which decides whether the data flow corresponding to the data flow description information of the first packet needs to be distributed; and Step 3, the SDN controller delivers the distribution rule flow table to the distribution gateway.

If the first packet does not cache a backup of the first packet in the distribution gateway when being sent to the DPI, the SDN controller notifies the DPI to return the first packet to the distribution gateway by redirection or in a manner of SDN controller to be set as a distribution. If the first packet caches a backup of the first packet in the distribution gateway when being sent to the DPI, the first packet reaching the DPI does not need to be returned to the distribution gateway.

Step 4, the distribution gateway distributes the corresponding data flow according to the distribution rule flow table in a manner of address translation NAT, wherein the corresponding data flow includes: the first packet, one or more data packets used by subsequent negotiation signalling and one or more pure data packets after application layer negotiation is completed.

Specifically, in step 4, the distribution gateway distributes the first packet according to the distribution rule flow table in a manner of address translation, and distributes, after filtering the data packet behind the first packet according to the quintuple, the data packet used by the subsequent negotiation signalling and the pure data packet after the application layer negotiation completes according to the distribution rule flow table in a manner of address translation.

Preferably, generating, by the SDN controller, a distribution rule flow table according to the data flow description information and the preset distribution strategy and sending the distribution rule flow table to the distribution network include: generating, by the SDN controller, a distribution rule flow table according to the data flow description information and the preset distribution strategy, wherein the generated distribution rule flow table includes information which decides whether the data flow corresponding to the data flow description information of the first packet needs to be distributed, when the data flow needs the distribution, the distribution rule flow table is delivered to the distribution gateway, redirection indication information is sent to the data centre through a specific interface to indicate the data centre to redirect the first packet to the distribution gateway according to the distribution gateway address carried in the redirection indication information.

Preferably, after the SDN controller selects a corresponding mobile network gateway for a terminal which at least establishes a PDN connection, the technical solution of the embodiments of the present disclosure preferably includes the following processing:

1. The SDN controller sends a data flow table to a mobile network gateway and a distribution gateway, wherein the data flow table sent to the mobile network gateway and the distribution gateway ensures that the first packet when a terminal application is initiated can be intercepted by the distribution gateway.

2. The distribution gateway intercepts the first packet according to the data flow table and send, after performing backup cache or not performing cache on the first packet, the first packet to the SDN controller.

3. The SDN controller sends the first packet to the data centre.

4. The data centre detects the first packet, acquires the flow distribution information of the first packet and feeds back the flow distribution information to the SDN controller.

5. The SDN controller generates the distribution rule flow table according to the data flow description information and the preset distribution strategy and sends the distribution rule flow table to the distribution network.

6. The distribution gateway distributes the corresponding data flow according to the distribution rule flow table in a manner of address translation NAT, wherein the corresponding data flow includes: the cached first packet or the cached backup of the first packet, the data packet used by the subsequent negotiation signalling and the pure data packet after the application layer negotiation completes.

II. In a case where an application of a second type, which is initiated by the terminal and of which the application type can be detected by port numbers and protocol numbers but the quintuple information cannot be acquired by detecting the first packet:

Step 1, the SDN controller sends an acquired distribution rule and processing rule to the DPI, wherein the distribution rule is information of the application type and whether the application type is the information needing to be distributed, and the processing rule is the NAT information used by the application needing to be distributed;

Step 2, the DPI detects an acquired negotiation signalling to acquire the data flow description information, decides whether the application needs the distribution according to the distribution rule, and when it is decided that the application needs the distribution, the DPI or other functional nodes perform NAT processing on a data packet used by the negotiation signalling according to the processing rule; and Step 3, the SDN controller receives the data flow description information sent by the DPI, and delivers the distribution rule flow table to the distribution gateway according to the data flow description information.

In a case of an application of a second type, which is initiated by the terminal and of which the application type can be detected by port numbers and protocol numbers but the quintuple information cannot be acquired by detecting the first packet:

Step 1, the SDN controller receives an application type sent by the DPI after the DPI detects a negotiation signalling and acquires the application type;

Step 2, the SDN controller decides whether distribution is needed according to the application type and the distribution strategy, and when it is decided that the distribution is needed, sends a processing rule for a data packet used by negotiation signalling to the DPI and/or a specific functional node;

Step 3, the DPI or the specific functional node performs NAT processing on the data packet used by the negotiation signalling according to the processing rule;

Step 4, the SDN controller receives the data flow description information sent by the DPI after the DPI performs further detection on the data packet used by the negotiation signalling; and Step 5, the SDN controller delivers the distribution rule flow table to the distribution gateway according to the data flow description information to make the distribution network perform distribution according to the distribution rule.

In the above-mentioned application type, the following processing also may be performed:

Step 1, the SDN controller sends a data flow table to the mobile network gateway or the distribution gateway, wherein the data flow table sent to the distribution gateway or the mobile network gateway ensures that the first packet when a terminal application is initiated can be intercepted by the distribution gateway or the mobile network gateway;

Step 2, after caching or not caching backup of a first packet according to the data flow table, the distribution gateway or the mobile network gateway sends same to the SDN controller and then to the DPI or directly sends same to the DPI;

Step 3, the SDN controller detects the application type of the first packet in local and acquires the application type, or notifies the DPI to detect the application type of the first packet and acquires the application type detected by the DPI, or the DPI acquires the first packet of the data from the distribution gateway or the mobile network gateway, and then detects the application type and reports the acquired application type to the SDN controller;

Step 4, the SDN controller decides whether the application needs the distribution according to the application type and the acquired distribution strategy, and when it is decided that the application needs the distribution, notifies the mobile network gateway or the distribution gateway to send the data packet used by the negotiation signalling for subsequent detection to the DPI for detection;

Step 5, the SDN controller receives the data flow description information from the DPI, wherein the DPI detects the data packet used by the subsequent negotiation signalling, acquires corresponding data flow description information, performs NAT processing on the data packet used by the subsequent negotiation signalling, and sends the data flow description information to the SDN controller; and Step 6, the SDN controller delivers the distribution rule flow table to the distribution gateway according to the data flow description information to make the distribution network perform distribution according to the distribution rule.

III. In a case of the application of the third type, i.e., an application initiated by the terminal does not need the application layer negotiation signalling and directly sends and receives a data packet, the corresponding quintuple information and application type are acquired by performing statistical analysis on the data flow, and the data will not be refused by a receiver even though the source address information is changed timely in a process of delivering the data flow:

Step 1, after the DPI collects statistics on the received data flow and acquires the data flow description information, the SDN controller receives the data flow description information sent by the DPI; and Step 2, the SDN controller generates the distribution rule flow table according to the data flow description information and the distribution strategy and sends the distribution rule flow table to the distribution network.

The specific signalling interaction of the above-mentioned three kinds of application types are described in details below with reference to the accompany drawings.

Example IV

Figure 6:
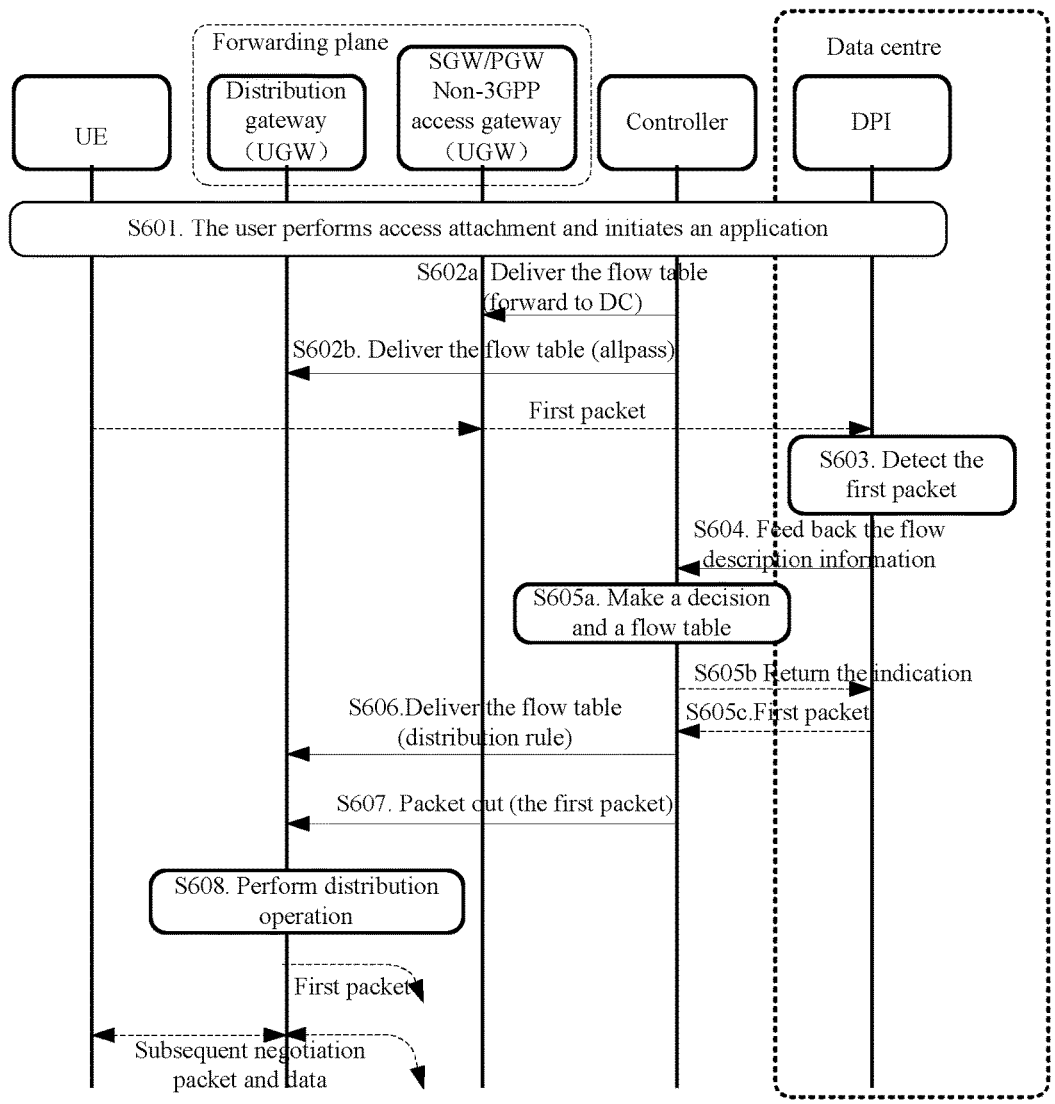
FIG. 6 is an operation flowchart of data flow distribution of embodiment IV of the present disclosure.

The principle of the embodiments of the present disclosure is illustrated based on the method as shown in FIGS. 3-5 mentioned above. The present embodiment is suitable for a kind of applications initiated by the terminal UE, the features of such applications are that applications which can be detected by the DPI through known port numbers and protocol numbers, for example, services such as ftp connected based on TCP, may make the DPI of the data centre detect the quintuple according to the first packet of the TCP protocol. After receiving the first packet of the negotiation initiated by the UE, the DPI of the data centre can acquire the quintuple information by detecting the first packet. As shown in FIG. 6, the flow is described as follows:

Step S601: the terminal user UE accesses a network or a 3GPP network or a non-3GPP network and ultimately can access an EPC core network controlled by the SDN. The terminal UE establishes at least one PDN connection.

Step S602: The SDN controller delivers the flow table to related gateways, respectively, such as the SGW, the PGW, the SGSN, the GGSN, non-3GPP access gateway, or the UGW where the distribution gateway is located, and the flow table ensures that the first packet of the data flow, or can reach the PGW/UGW, wherein the PGW/UGW forward the first packets of the data flows of all of or a part of the applications to the DPI of the data centre according to an indication operation delivered by the SDN controller to the PGW/UGW; or is intercepted by the distribution gateway, wherein the data is redirected by the distribution gateway to the DPI or is sent by the distribution gateway to the DPI through the SDN controller.

For the first packet sent to the DPI, the backup thereof is cached in the distribution gateway or is not cached.

Step S603: the terminal UE initiates a kind of negotiation of the application, the features of such applications are that applications which can be detected by the DPI through known port numbers and protocol numbers of the first packet, for example, services such as ftp connected based on TCP, may make the DPI of the data centre detect the quintuple according to the first packet of the TCP protocol. After receiving the first packet of the negotiation initiated by the UE, the DPI of the data centre can acquire flow description information, such as quintuple information, by detection.

Step S604: the data centre notifies the flow description information to the SDN controller through an Xy interface.

Step S605: the SDN controller makes a decision and a corresponding flow table according to the subscription information and the dynamic strategy information (such as the PCC strategy acquired from the PCRF).

The decision is whether the data flow corresponding to the flow description needs to be distributed. If the SDN controller decides that the distribution is needed, the SDN controller sends indication information to the DPI through the Xy interface, and if the distribution gateway does not cache the backup of the first packet, the DPI is notified to return the first packet detected above to the SDN controller. The DPI sends the first packet to the SDN controller according to the indication.

Or, the SDN controller notifies the DPI to redirect the first packet to the distribution gateway.

If the SDN controller decides that the distribution is not needed, the SDN controller feeds back an indication that the distribution is not needed to the data centre, and then the data centre directly sends the first packet to an external network (such as internet). The operation without distribution is not shown in the figure. The operation described below is for the case where the distribution is needed.

Step S606: the SDN controller delivers the flow table mentioned above to the UGW where the distribution gateway is located for execution. Optionally, the SDN controller also upgrades the flow table on the SGW, the PGW, the SGSN or the GGSN.

Step S607: the SDN controller sends the received first packet to the UGW where the distribution gateway is located by a Packet out message of the OpenFLOW.

Step S608: after receiving the flow table carrying the distribution rule, the distribution gateway performs distribution on the data flow corresponding to the rule in the flow table. The distributed data flow includes the above-mentioned first packet or the cached backup of the first packet, the data packet used by the subsequent negotiation signalling and the pure data packet after the application layer negotiation completes.

The SDN controller forwards the first packet to the distribution gateway and performs, after the distribution gateway performs NAT, distribution on the first packet; and the data packets behind the first packet are filtered by the distribution gateway according to quintuple, then are subjected to NAT translation, and then are distributed. In this way, it is ensured that all the source addresses of the data packets are the same (i.e., the address subjected to NAT) for the application server, thereby avoiding the problem that the connection between the terminal UE and the application layer of the server breaks due to the fact that the address is changed.

An optimization implementation of embodiment IV, as shown in FIG. 6, the first packet sent in step S605$c$ may be carried in step S604, and therefore when the SDN controller decides that the distribution is needed, S605$b$ does not need to be executed at all, and the SDN controller can only directly execute the subsequent distribution operation, and when the SDN controller decides that the distribution is not needed, it needs to notify the data centre that the distribution is not needed through S605$b$.

Example V

Figure 7:
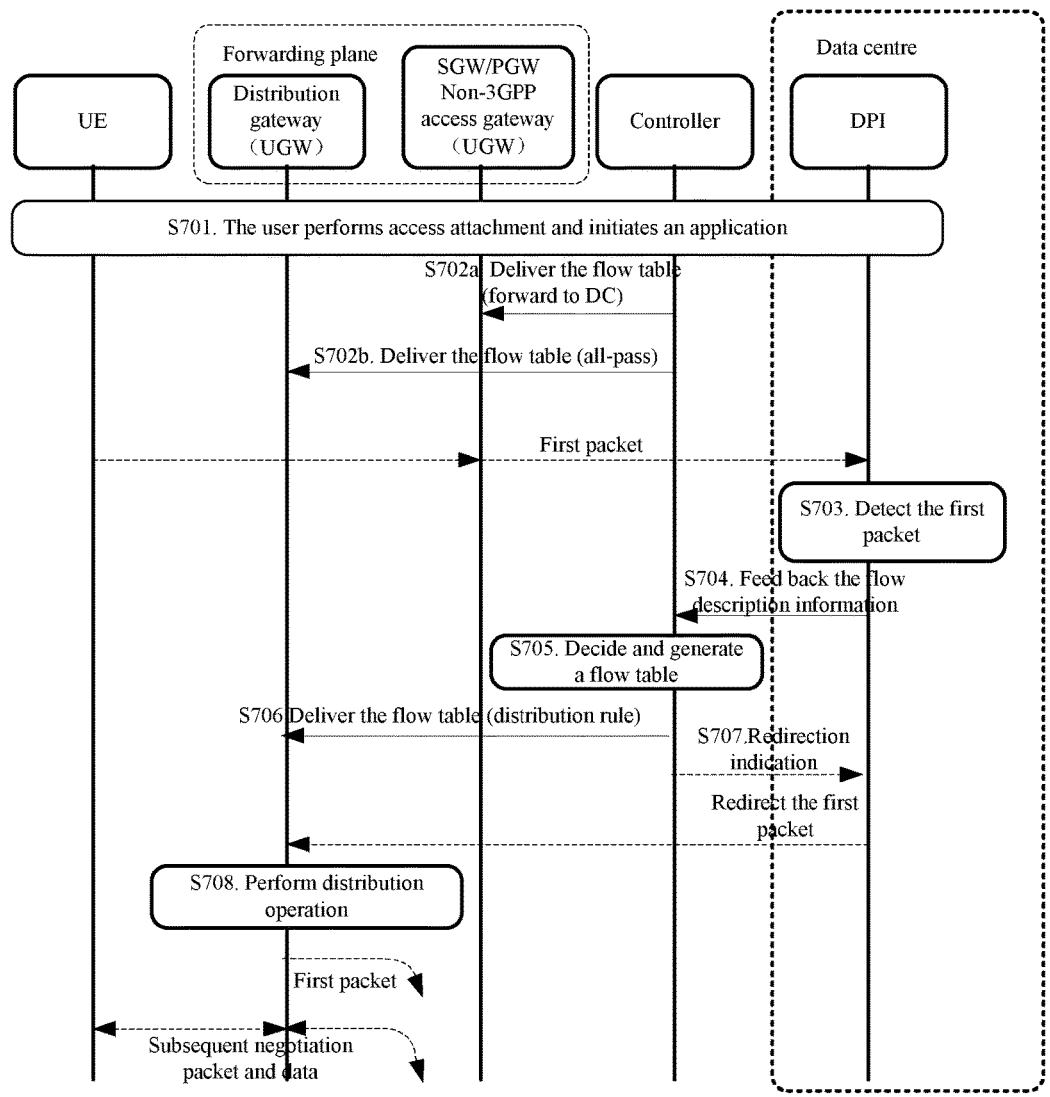
FIG. 7 is an operation flowchart of data flow distribution of embodiment V of the present disclosure.

FIG. 7 will illustrate the principle of the embodiments of the present disclosure by describing the second implementation flow based on the method described in the schematic diagram of FIGS. 3-5 mentioned above. The application type suitable for the present embodiment is the same as that of embodiment IV, and the principle thereof is also similar to embodiment IV, the difference lies in that the first packet detected by the data centre is sent to the distribution gateway through a redirection operation rather than being returned to the SDN controller and then sent to the distribution gateway through the Packet out message. The specific steps are described as follows:

Steps S701-S704 are the same as Steps S601-S604;

Steps S705-S707: the SDN controller makes a decision according to the subscription information and the dynamic strategy information (such as the PCC strategy acquired from the PCRF) and detection information acquired from the DPI.

The decision is whether the data flow corresponding to the flow description needs to be distributed. If the SDN controller decides that the distribution is needed, the SDN controller makes a rule for distribution and delivers same to the distribution gateway in a manner of delivering a flow table (step S706).

In addition, the SDN controller also sends a redirection indication information to the data centre through an Xy interface (message corresponding to FIG. S707), wherein the address in the distribution gateway needs to be notified to the data centre in the signalling, and the data centre redirects the first packet detected above to the distribution gateway (as shown by the imaginary line at the end of FIG. S707).

If the SDN controller decides that the distribution is not needed, the SDN controller feeds back an indication that the distribution is not needed to the data centre, and then the data centre directly sends the first packet to an external network (such as internet). The operation without distribution is not shown in the figure. The operation described below is for the case where the distribution is needed.

Step S708 is the same as Step S608;

Example VI

Figure 8:
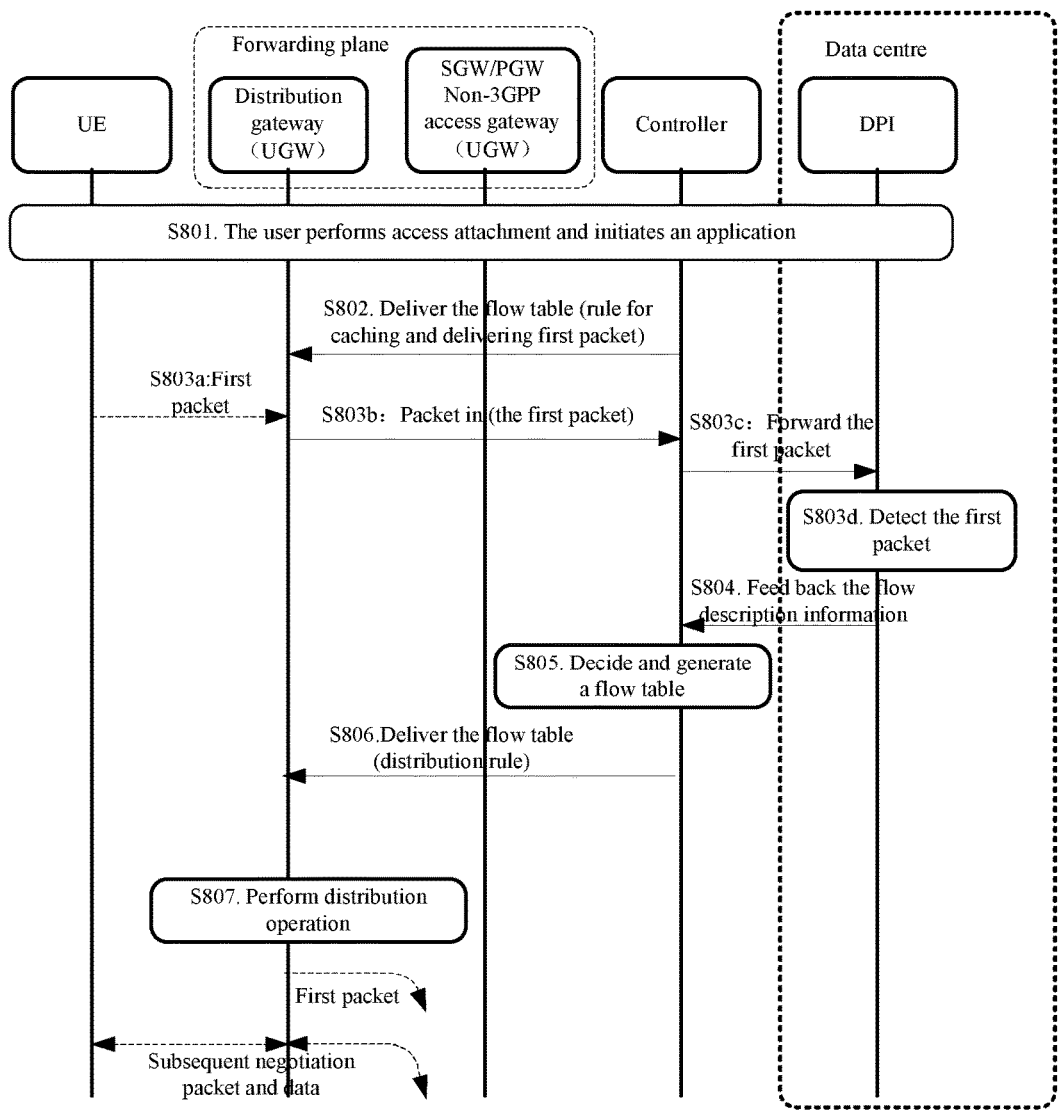
FIG. 8 is an operation flowchart of data flow distribution of embodiment VI of the present disclosure.

FIG. 8 will illustrate the principle of the embodiments of the present disclosure by describing the third implementation flow based on the method described in the schematic diagram of FIGS. 3-5 mentioned above. The application type suitable for the present embodiment is the same as that of embodiment IV, and the principle thereof is also similar to embodiment IV, the difference lies in that for the first packet reporting mechanism, the first packet is directly intercepted by the distribution gateway rather than being sent to the data centre by the PGW and then returned to the SDN controller, the distribution gateway stores the packet and sends the backup of the packet to the SDN controller through a packet In message, and the SDN controller sends the backup of the packet to the DPI of the data centre for packet inspection. After the data centre detects the flow description information, the SDN controller makes a distribution rule (if needing distribution) according to the flow description information and delivers a corresponding flow table to the distribution gateway. At this moment, the distribution gateway performs distribution processing on the cached first packet and the subsequent packet according to the indication of the flow table (i.e., the source address is translated as an address subjected to NAT).

Step S801 is the same as Step S601.

Step S802: the SDN controller delivers the flow table to related gateways, respectively, such as the SGW, the PGW, the SGSN, the GGSN, non-3GPP access gateway and the UGW where the distribution gateway is located, wherein the flow table ensures that the first packet of the data flow, wherein the flow table on the distribution gateway can ensure that the distribution gateway can intercept the first data packet, i.e., the first packet, when the application is initiated, cache same and deliver the backup of same to the SDN controller.

Step S803: the application is initiated, the first packet of the application reaches the distribution gateway, and the distribution gateway intercepts and caches same. The distribution gateway sends the backup of the intercepted first packet to the SDN controller by the packet in message. The SDN controller resends the packet to the DPI of the data centre to be detected.

The DPI detects the data packet and acquires the application type and flow description information of the application.

Step S804, the DPI of the data centre feeds back the application type and the flow description information to the SDN controller.

Step S805: the SDN controller decides whether the data flow needs the distribution according to the subscription information and the dynamic strategy information (such as the PCC strategy acquired from the PCRF) and the application type and the flow description information which are acquired from the DPI, and makes a decision when the data flow needs the distribution.

Step S806: the SDN controller delivers the flow table mentioned above to the UGW where the distribution gateway is located for execution. Optionally, the SDN controller also upgrades the flow table on the SGW, the PGW, the SGSN or the GGSN.

Step S807: after receiving the flow table carrying the distribution rule, the distribution gateway performs distribution on the data flow corresponding to the rule in the flow table. The distributed data flow includes the above-mentioned cached first packet, the data packet used by the subsequent negotiation signalling and the pure data packet after the application layer negotiation completes.

Example VII

Figure 9:
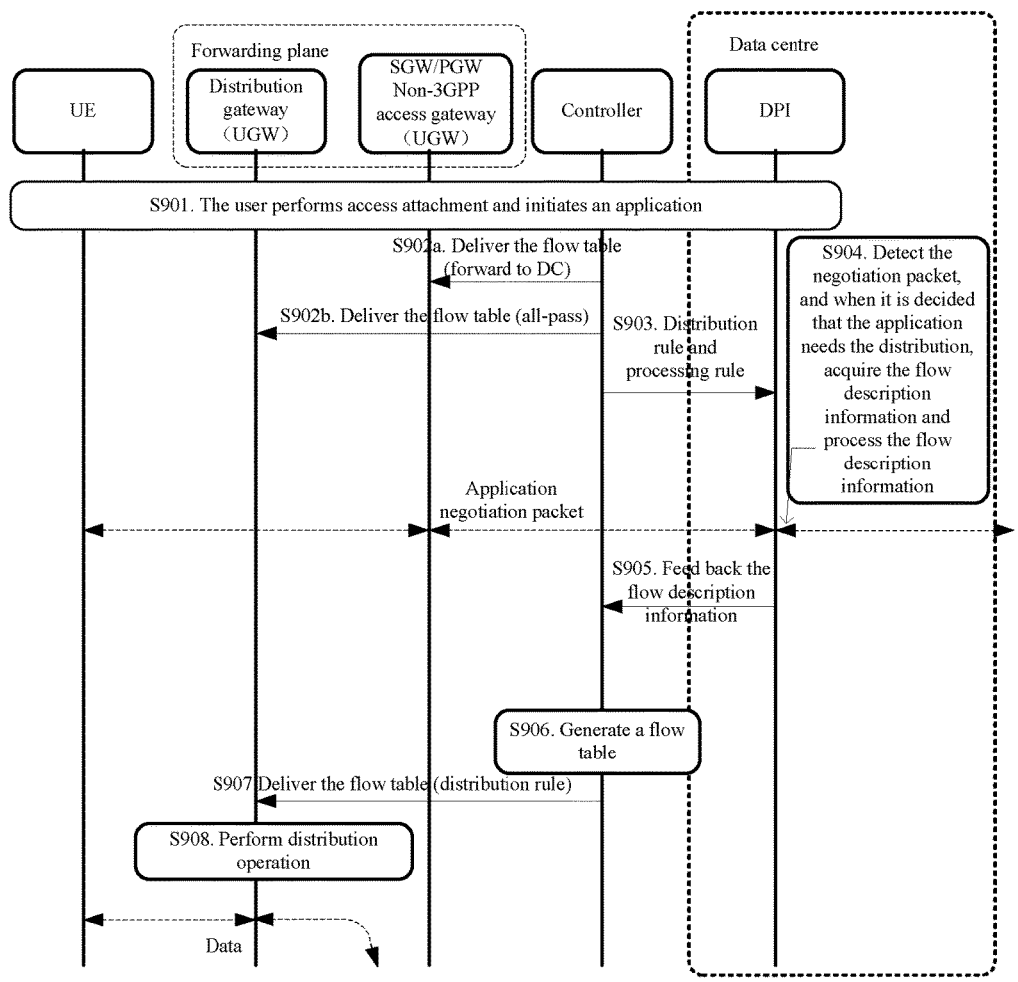
FIG. 9 is an operation flowchart of data flow distribution of embodiment VII of the present disclosure.

FIG. 9 will illustrate the principle of the embodiments of the present disclosure by describing the fourth implementation flow based on the method described in the schematic diagram of FIGS. 3-5 mentioned above.

The present embodiment aims at another kind of applications initiated by the terminal UE, the features of such applications are that the DPI of the data centre can only detect the application type of the application by detecting the first packet but cannot detect the corresponding flow description information (such as quintuple), such as a Session Initiate Protocol (SIP) service. This kind of services need the DPI to detect the packets of the negotiations of a plurality of application layers, even the packets of the negotiations of all the application layers, to acquire the flow description information (such as quintuple) of the application. In this scenario, the source address of the application layer negotiation signalling also uses an address which does not perform NAT, that is to say, the application layer negotiation signalling also performs external communication by the PGW/data centre rather than directly performs distribution by the UGW/distribution gateway, and the pure data flow is distributed from the UGW/distribution gateway after the negotiation completes. The data centre of the application layer negotiation needs a function similar to an Application Layer Gateway (ALG), that is, the DPI or other functional nodes need to insert the address subjected to NAT into the application layer negotiation signalling.

By means of the above-mentioned processing, the source IP address of the application layer negotiation signalling and the source IP address of the subsequent data flow are different; however, since the address subjected to NAT is inserted into the application layer negotiation signalling and is sent to an application server during the application layer negotiation, the application server uses the address subjected to NAT to communicate with the UE, and the data can be distributed directly through a distribution gateway route rather than through the gateway route where the core network PGW/UGW is located.

In terms of the problem of the interaction between the SDN controller and the data centre, the present embodiment sends in advance the distribution rule and the processing rule to the data centre (DPI and other functional nodes) using the SDN controller, after the application is detected, the data centre directly decides whether distribution is needed, when the data flow needs the distribution, the data centre directly processes the negotiation signalling of the functional application layer, and feeds back the detailed flow description information detected to the SDN controller.

The specific flow description is as follows:

Steps S901-S902 are the same as the step S601-S602;

Step S903: the SDN controller sends in advance the distribution rule and the processing rule for the application layer to the DPI or other functional nodes of the data centre through the Xy interface The distribution rule carried in the function includes a classification list indicating which applications need to be distributed and which applications do not need to be distributed; and the processing rule includes NAT information (including addresses and port numbers) used when the distribution is needed.

Step S904: the DPI of the data centre performs deep packet inspection on the application layer negotiation, and decides, after detecting the application type (generally, the corresponding application type can be detected by detecting the data packet of the first application layer negotiation signalling), to perform distribution on the application according to the distribution rule sent in advance in step S903.

When the data flow needs the distribution, the application layer negotiation signalling is processed according to the processing rule sent in advance in step S903, and processing the application layer negotiation signalling is the processing operation mentioned previously in the present embodiment. It is not repeated herein.

If the SDN controller decides that the distribution is not needed, the signalling processing operation performed on the application layer in this step and the subsequent steps do not need to be performed.

Step S906: the SDN controller makes a flow table for distribution according to the subscription information, the dynamic strategy information (such as the PCC strategy acquired from the PCRF) and the flow description information acquired from the data centre.

Steps S907-S908: the SDN controller delivers the flow table for distribution to the distribution gateway, and the distribution gateway performs distribution.

Note: other functional nodes of the data centre, mentioned in the present embodiment, refers to functional nodes which can perform NAT address insertion and replacement on the application layer negotiation signalling. In general, the main function of the DPI is performing deep packet inspection, but other functions, such as the above-mentioned function of performing NAT address insertion and replacement on the application layer negotiation signalling, also can be integrated. If the DPI practically deployed cannot perform this function, other functional nodes are needed to independently perform this function, and it is required that there is a corresponding interactive processing between the DPI and the functional node; and if the DPI practically deployed can perform this function, other functional nodes are not needed.

Example VIII

Figure 10:
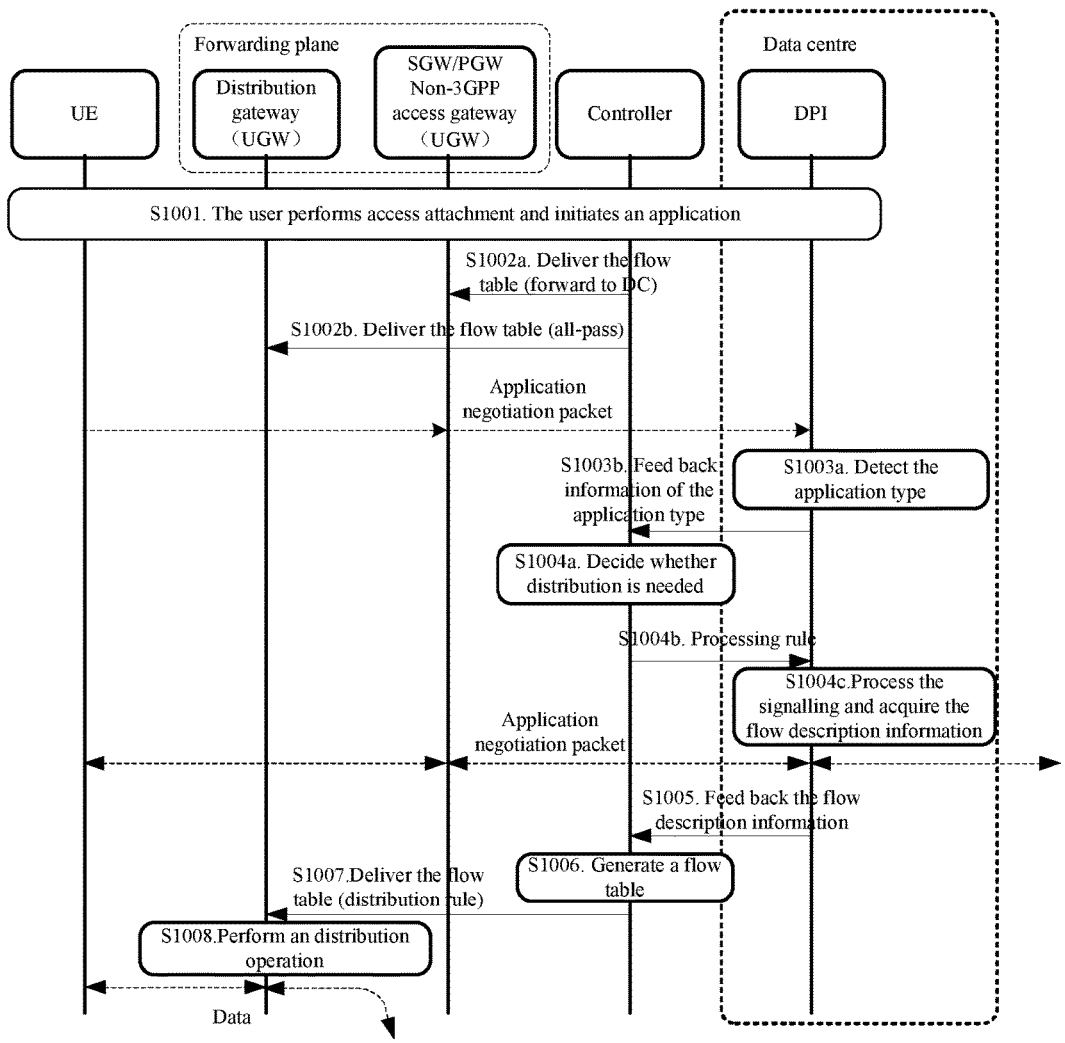
FIG. 10 is an operation flowchart of data flow distribution of embodiment VIII of the present disclosure.

FIG. 10 will illustrate the principle of the embodiments of the present disclosure by describing the fifth implementation flow based on the method described in the schematic diagram of FIGS. 3-5 mentioned above.

The application types suitable for the present embodiment, the mechanism for acquiring the application type, the mechanism for acquiring flow description information and the mechanism for processing the application negotiation signalling are all the same as embodiment VII, and the difference lies in the interaction between the SDN controller and the data centre. In the present embodiment, the data centre is used to firstly detect the application layer negotiation signalling (it is the first data packet in general), acquire the corresponding application type and then report the application type to the SDN controller, and the SDN controller decides whether distribution is needed the application according to information such as the local strategy and the sign strategy, and notifies the result to the data centre. When the data flow needs the distribution, the DPI of the data centre or other functional nodes will process the application layer negotiation signalling (see the description of embodiment VII for the processing mechanism), and further acquire the flow description information of the corresponding application by detecting the application layer negotiation signalling, and then Feed back the flow description information to the SDN controller.

The specific flow description is as follows:

Steps S1001-S1002 are the same as the step S901-S902;

Step S1003a: an application is initiated, and when the data packet of the application layer negotiation signalling (it is the first data packet in general) is sent to the data centre, the DPI of the data centre can detect the application type of the application by analyzing the packet.

Step S1003b: the DPI of the data centre reports the detected application type to the SDN controller.

Step S1004a: the SDN controller decides whether distribution is needed the application according to the local strategy, the subscription information of the UE and the application reported by the data centre.

Step S1004b: the SDN controller sends the decided result and the corresponding processing rule (if needing distribution) to the DPI of the data centre and other functional nodes.

Step S1004c: When the data flow needs the distribution, the data centre further processes the application layer negotiation signalling according to the processing rule (see the description of embodiment VII for the processing mechanism), and further detects to acquire the flow description information.

If the distribution is not needed, this step and the subsequent steps are not performed.

Step S1005: the DPI of the data centre feeds back the acquired flow description information to the SDN controller.

Steps S1006-S1008 are the same as the step S906-S908.

Note: the description of other functional nodes of the data centre, mentioned in the present embodiment, is the same as the corresponding description in Example VII.

Example IX

Figure 11:
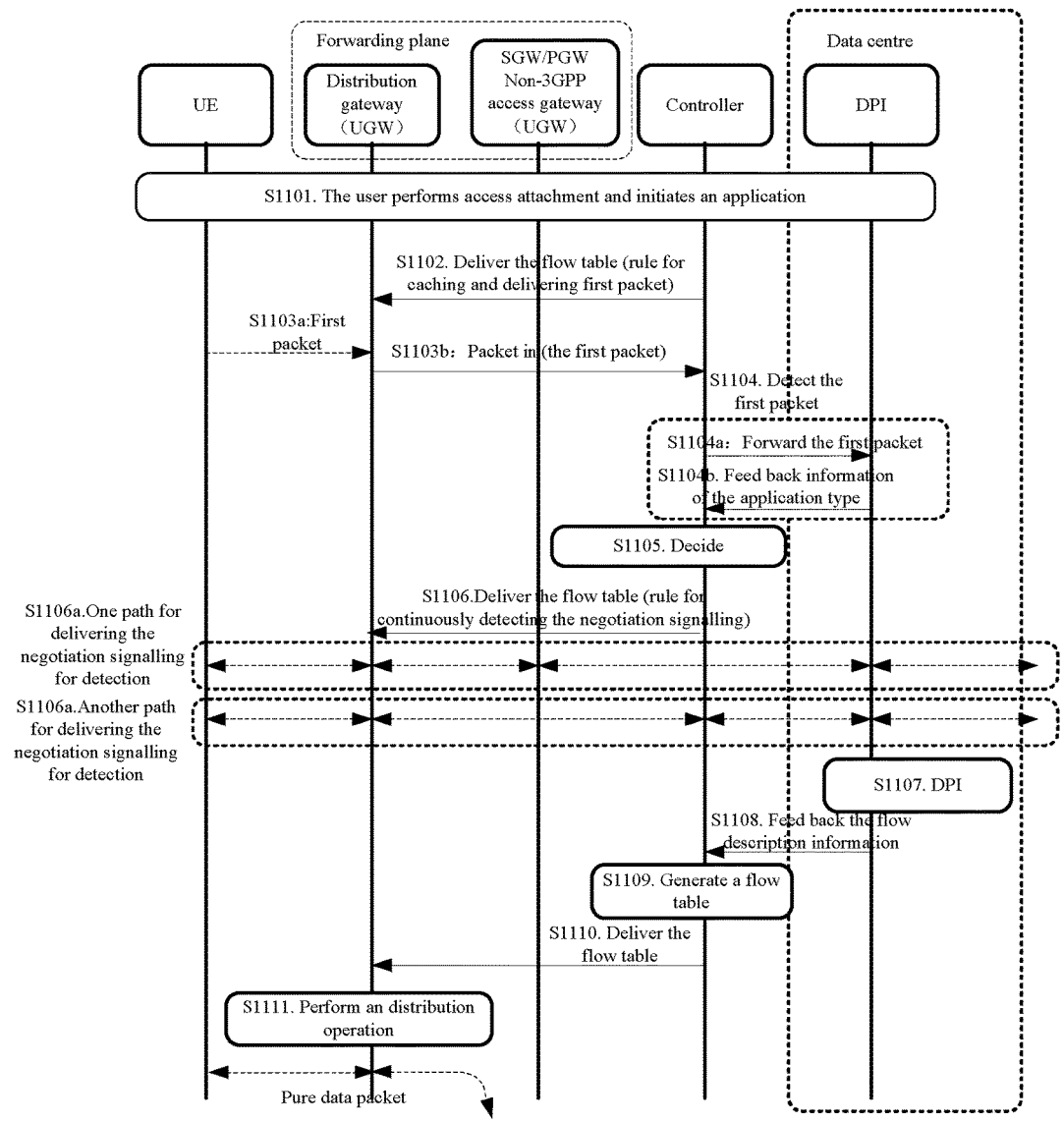
FIG. 11 is an operation flowchart of data flow distribution of embodiment IX of the present disclosure.

FIG. 11 will illustrate the principle of the embodiments of the present disclosure by describing the sixth implementation flow based on the method described in the schematic diagram of FIGS. 3-5 mentioned above.

The application types suitable for the present embodiment and the mechanism for processing the application negotiation signalling are the same as embodiment VII, and the difference lies in the mechanism for delivering the data packet and the detection of the application type. In the present embodiment, the distribution gateway is used to intercept the first packet of the application and delivers same to detect the application type, and the SDN controller decides whether distribution is needed. When the data flow needs the distribution, the data packets which needs distribution cannot be filtered only according to the information of the application type fed back by the DPI. Therefore, the DPI of the data centre needs to further detect the application layer negotiation signalling to acquire the flow description information. The negotiation signalling of these application layers is sent to the DPI for deep packet inspection according to the indication of the SDN controller or according to the path from the distribution gateway to the SDN controller to the data centre or the path from the distribution gateway to the PGW-U to the data centre. By means of deep packet inspection, the acquired flow description information is sent to the SDN controller, and the SDN controller makes a distribution rule according to this and delivers same to the distribution gateway through a flow table to perform distribution.

In the present embodiment, the source IP addresses of the application layer negotiation signalling and the pure data flow are different, as the application layer negotiation signalling finally performs external routing by the PGW or the data centre and uses the address of the UE corresponding to PDN connection, and the service of the pure data is distributed and uses the address subjected to NAT on the distribution gateway.

The specific flow description is as follows:

Steps S1101-S1102 are the same as the step S801-S802;

Step S1103: an application is initiated, and the first packet of the application reaches the distribution gateway, and the distribution gateway intercepts the first packet and sends the intercepted first packet to the SDN controller through a packet in message.

Step S1104: the application type of the packet reported in step S1003 is locally detected by the SDN controller, or is detected by the DPI of the data centre, and the DPI feeds back the application type and the flow description information to the SDN controller.

Step S1105: the SDN controller decides whether distribution is needed the application according to the local strategy, the subscription information of the UE and the application reported by the data centre.

Step S1106: the SDN controller sends the decided result and the rule for continuously detecting the negotiation signalling (if needing distribution) to the distribution gateway in a manner of delivering the flow table.

Step S1106: when the data flow needs the distribution, then:

A: the distribution gateway continues to send the data packet of the application layer negotiation signalling to the DPI for deep packet inspection according to the path from the distribution gateway to the SDN controller to the data centre; or, B: send to the DPI for deep packet inspection according to the path from the distribution gateway to the PGW-U to the data centre.

Step S1107: the DPI performs deep packet inspection and processes the application layer negotiation signalling (it is mainly that the DPI or other functional nodes insert the address subjected to NAT into the signalling of the application layer negotiation).

Step S1108: the DPI feeds back the detected flow description information to the SDN controller.

Step S1109: the SDN controller decides a distribution rule according to the local strategy, the subscription information of the UE and the flow description information reported to the data centre.

Step S1110: the SDN controller delivers the distribution rule to the distribution gateway.

Step S1111: the distribution gateway performs distribution operation on the pure data flow.

Note: the description of other functional nodes of the data centre, mentioned in the present embodiment, is the same as the corresponding description in Example VII.

Example X

The present embodiment describes an implementation method for simple and specific applications, i.e., aiming at a kind of applications that do not need the application layer negotiation signalling and directly send and receive the data packet. The DPI of the data centre can acquire the quintuple information and the application type by performing statistical analysis on the data flow, and the data will not be refused by a receiver even though the source address information is changed in a process of delivering the data flow.

For such applications, the DPI of the data centre collects statistics on the flow description information and directly sends same to the SDN controller through an Xy interface, if the SDN controller decides that the data flow needs to be distributed, a flow table carrying the distribution rule is directly delivered to the distribution gateway, and the distribution gateway performs distribution. The data centre is only responsible for calculating the flow description information and is not responsible for performing any processing on the data flow, and this is different from embodiments IV, V, VI mentioned above.

In summary, by means of the embodiments of the present disclosure and in combination with the SDN technology and the deep packet inspection technology, the problems in the related technologies that the serious data circuitry and the waste of bandwidth resources of the backbone network are caused by the fact that the position of the PGW is relatively high are solved, and the application/service data flow based distribution is implemented. Compared with the related art that distribution is implemented based on a PDN connection and based on a bearer, the technical solutions in embodiments of the present disclosure implement finer-granularity distribution, and improve experience of users and competition of operators, and the problem that a distribution application and a non-distribution application cannot operate at the same time in a case where a terminal only supports one address/PDN connection is further solved.

Embodiment of the Device

Figure 12:
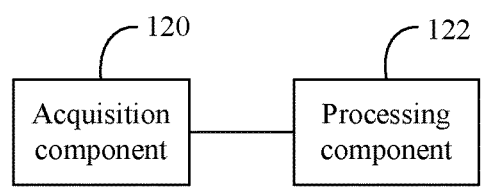
FIG. 12 is a schematic diagram of a controller of the embodiments of the present disclosure.

According to the embodiments of the present disclosure, an SDN controller is provided, FIG. 12 is a schematic structural diagram of an SDN controller of the embodiments of the present disclosure, as shown in FIG. 12, the SDN controller according to the embodiments of the present disclosure includes: an acquisition component 120 and a processing component 122, the various components of the embodiments of the present disclosure are described below in detail.

The acquisition component 120 is configured to acquire data flow description information of a data flow, wherein the measurement information includes at least one of: an application type of the data flow and quintuple information of the data flow.

The acquisition component 120 is configured to acquire a signal to be sent. send a data flow table to a mobile network gateway and/or a distribution gateway before acquiring the data flow description information of the data flow, wherein the data flow table is used for indicating the mobile network gateway or the distribution gateway to send a data flow of a corresponding terminal, which needs to be detected, to a Deep Packet Inspection (DPI) function for detection. The mobile network gateway includes one of: a user plane function of a SGW, a user plane function of a PGW, a user plane function of a SGSN, a user plane function of a GGSN or a user plane function of a non-3GPP gateway. The DPI is located at a data centre or located at a Traffic Detection Function (TDF).

The acquisition component 120 is further configured to acquire the data flow description information of the data flow needing detection from the DPI.

The processing component 122 is configured to decide, according to the data flow description information, whether the data flow needs a distribution, and when the data flow needs the distribution, deliver a distribution rule flow table to a distribution gateway.

The processing component 122 is further configured to acquire a distribution strategy locally or from a strategy server, decide, according to the data flow description information and the distribution strategy, whether the data flow corresponding to the data flow description information needs the distribution, and when it is decided that the data flow needs the distribution, generate the distribution rule flow table and delivering the distribution rule flow table to the distribution gateway.

The above-mentioned technical solution of the embodiments of the present disclosure is described with respect to three kinds of application types.

I. In a case of an application of a first type, which is initiated by the terminal and of which the application type and the quintuple information are able to be acquired by detecting the first packet:

the receiving component is further configured to receive an application type and quintuple information, wherein the application type and the quintuple information are sent by the DPI after the DPI receives and detects the first packet of negotiation; and the processing component 122 is further configured to decide whether the data flow needs the distribution according to the application type, the quintuple information and a distribution strategy, and when it is decided that the data flow needs the distribution, generate the distribution rule flow table and deliver the distribution rule flow table to the distribution gateway, wherein the data flow includes: the first packet, one or more data packets used by subsequent negotiation signalling and one or more pure data packets after application layer negotiation is completed.

The processing component 122 is further configured to send a data flow table to the mobile network gateway and/or the distribution gateway, wherein the data flow table sent to the distribution gateway enables the distribution gateway to intercept the first packet when a terminal application is initiated.

In addition, the processing component 122 is further configured to, when the distribution gateway does not perform backup cache on the first packet, send indication information to the DPI to indicate the DPI to redirect the first packet to the distribution gateway or indicate the DPI to return the first packet to the distribution gateway through the SDN controller.

II. In a case of an application of a second type, which is initiated by the terminal and of which the application type can be detected by port numbers and protocol numbers but the quintuple information cannot be acquired by detecting the first packet:

Processing manner I: The processing component 122 is further configured to send an acquired distribution rule and processing rule to the DPI, wherein the distribution rule is information of the application type and whether the application type is the information needing to be distributed, and the processing rule is the NAT information used by the application needing to be distributed;

the receiving component is further configured to, after the DPI detects an acquired negotiation signalling, acquires the data flow description information and decides whether the application needs the distribution according to the distribution rule, and the DPI or other functional nodes perform NAT processing on a data packet used by the negotiation signalling according to the processing rule when it is decided that the application needs the distribution, receive the data flow description information sent by the DPI; and the processing component 122 is further configured to deliver the distribution rule flow table to the distribution gateway according to the data flow description information.

Processing manner II: the receiving component is further configured to receive an application type sent by the DPI after the DPI detects a negotiation signalling and acquires the application type;

the processing component 122 is further configured to decide whether distribution is needed according to the application type and the distribution strategy, and when it is decided that the distribution is needed, send a processing rule for a data packet used by negotiation signalling to the DPI and/or a specific functional node;

the receiving component is further configured to, after the DPI or the specific functional node performs NAT processing on the data packet used by the negotiation signalling according to the processing rule, and the DPI performs further detection on the data packet used by the negotiation signalling, receive the data flow description information sent by the DPI; and the processing component 122 is further configured to deliver the distribution rule flow table to the distribution gateway according to the data flow description information.

Processing manner III: the processing component 122 is further configured to send a data flow table to the mobile network gateway or the distribution gateway, wherein the data flow table sent to the distribution gateway or the mobile network gateway ensures that the first packet when a terminal application is initiated can be intercepted by the distribution gateway or the mobile network gateway;

the processing component 122 is further configured to, after the distribution gateway or the mobile network gateway caches or does not caches the backup of the first packet according to the data flow table and then sends same to the SDN controller and then to the DPI or after the distribution gateway or the mobile network gateway caches or does not caches the backup of the first packet and then directly sends same to the DPI, detect an application type of the first packet locally to acquire the application type, or notify the DPI to detect the application type of the first packet and acquire the application type detected by the DPI, or acquire the application type acquired after the DPI acquires the first packet of the data from the distribution gateway or the mobile network gateway and detects the application type;

the processing component 122 is further configured to decide whether the application needs the distribution according to the application type and the acquired distribution strategy, and when it is decided that the application needs the distribution, notify the mobile network gateway or the distribution gateway to send the data packet used by the negotiation signalling for subsequent detection to the DPI for detection;

the receiving component is further configured to receive the data flow description information from the DPI, wherein the DPI detects the data packet used by the subsequent negotiation signalling, acquires corresponding data flow description information, performs NAT processing on the data packet used by the subsequent negotiation signalling, and sends the data flow description information to the SDN controller; and the processing component 122 is further configured to deliver the distribution rule flow table to the distribution gateway according to the data flow description information and the distribution strategy.

III. In a case where the application initiated by the terminal does not need the application layer negotiation signalling, directly sends and receives a data packet and acquires corresponding quintuple information and application type by the statistical analysis of the data flow, and the data flow will not be refused by a receiver even though the source address information is changed timely in a process of delivering the data flow, the receiving component is further configured to receive the data flow description information sent by the DPI after the DPI collects statistics on the received data flow and acquires the data flow description information; and the processing component 122 is further configured to generate a distribution rule flow table according to the data flow description information and the distribution strategy, and delivering the distribution rule flow table to the distribution gateway.

It should be noted that all the embodiments above acquire the application type and data flow description information of the corresponding application by means of the Deep Packet Inspection (DPI) function of the data centre. In practice, the embodiments of the present disclosure are not limited to the data centre to perform the DPI function, the DPI function also can be disposed on a data network element or a server behind the PGW/GGSN, for example, the Traffic Detection Function (TDF) network element of the 3GPP has the DPI function, and for such a scenario, the present disclosure is also applicable.

In summary, by means of the embodiments of the present disclosure and in combination with the SDN technology and the deep packet inspection technology, the problems in the related technologies that the serious data circuitry and the waste of bandwidth resources of the backbone network are caused by the fact that the position of the PGW is relatively high are solved, and the application/service data flow based distribution is implemented. Compared with the related art that distribution is implemented based on a PDN connection and based on a bearer, the technical solutions in embodiments of the present disclosure implement finer-granularity distribution, and improve experience of users and competition of operators, and the problem that a distribution application and a non-distribution application cannot operate at the same time in a case where a terminal only supports one address/PDN connection is further solved.

Obviously, those skilled in the technical field can implement various modifications and improvements for the present disclosure, without departing from the scope of the present disclosure. Thus, if all the modifications and improvements belong to the scope of the claims of the present disclosure and the similar technologies thereof, the present disclosure is intended to contain the modifications and improvements.

INDUSTRIAL APPLICABILITY

As stated above, the data flow distribution method and the controller provided in the embodiments of the present disclosure have the following beneficial effects: In combination with the SDN technology and the deep packet inspection technology, the problems in the related technologies that the serious data circuitry and the waste of bandwidth resources of the backbone network are caused by the fact that the position of the PGW is relatively high are solved, and the application/service data flow based distribution is implemented. Compared with the related art that distribution is implemented based on a PDN connection and based on a bearer, the technical solutions in embodiments of the present disclosure implement finer-granularity distribution, and improve experience of users and competition of operators. The problem that a distribution application and a non-distribution application cannot operate at the same time in a case where a terminal only supports one address/PDN connection is further solved.

What is claimed is:

1. A data flow distribution method, comprising:
   acquiring, by a software defined network (SDN) controller, data flow description information of a data flow; and
   deciding, by the SDN controller according to the data flow description information, whether the data flow needs a distribution, and when the data flow needs the distribution, delivering a distribution rule flow table to a distribution gateway,
   wherein before the SDN controller acquires the data flow description information of the data flow, the method further comprises: sending, by the SDN controller, a data flow table to a mobile network gateway and/or a distribution gateway, wherein the data flow table is used for indicating the mobile network gateway or the distribution gateway to send a data flow of a corresponding terminal to a Deep Packet Inspection (DPI) function for detection;
   wherein
   acquiring, by the SDN controller, the data flow description information of the data flow comprises: acquiring, by the SDN controller, the data flow description information of the data flow from the DPI; or,
   the mobile network gateway comprises one of: a user plane function of a Serving Gateway (SGW), a user plane function of a Packet Data Network Gateway (PGW), a user plane function of a Serving GPRS Support Node (SGSN), a user plane function of a Gateway GPRS Support Node (GGSN) or a user plane function of a non-3rd Generation Partnership Project (3GPP) gateway; or,
   the DPI is located at a data centre or located at a Traffic Detection Function (TDF).

2. The method as claimed in claim 1, wherein the data flow description information comprises at least one of: an application type of the data flow and quintuple information of the data flow.

3. The method as claimed in claim 1, wherein deciding, by the SDN controller according to the data flow description information, whether the data flow needs the distribution, and when the data flow needs the distribution, delivering the distribution rule flow table to the distribution gateway comprise:
   acquiring, by the SDN controller, a distribution strategy locally or from a strategy server, deciding, according to the data flow description information and the distribution strategy, whether the data flow corresponding to the data flow description information needs the distribution, and when it is decided that the data flow needs the distribution, generating the distribution rule flow table and delivering the distribution rule flow table to the distribution gateway.

4. The method as claimed in claim 1, wherein in a case where a terminal initiates an application of a first type:
   receiving, by the SDN controller, an application type and quintuple information, wherein the application type and the quintuple information are sent by the DPI after the DPI receives and detects the first packet of negotiation; and deciding, by the SDN controller, whether the data flow needs the distribution according to the application type, the quintuple information and a distribution strategy, and when it is decided that the data flow needs the distribution, generating the distribution rule flow table and delivering the distribution rule flow table to the distribution gateway, wherein the data flow comprises: the first packet, one or more data packets used by subsequent negotiation signalling and one or more pure data packets after application layer negotiation is completed;

wherein the application of the first type is an application of which the application type and the quintuple information are able to be acquired by detecting the first packet.

5. The method as claimed in claim 4, wherein the method comprises:

sending, by the SDN controller, a data flow table to the mobile network gateway and/or the distribution gateway, wherein the data flow table sent to the distribution gateway enables the distribution gateway to intercept the first packet when a terminal application is initiated, and send, after performing backup cache or not performing backup cache on the first packet, the first packet to the DPI through one of the following paths:

a first path: from the distribution gateway to the SDN controller and further to the DPI;

a second path: from the distribution gateway to the SGW/SGSN/non-3GPP gateway to the PGW/GGSN and further to the DPI; and a third path: from the distribution gateway to the DPI.

6. The method as claimed in claim 5, wherein the method comprises:

when the distribution gateway does not perform backup cache on the first packet, sending, by the SDN controller, indication information to the DPI to indicate the DPI to redirect the first packet to the distribution gateway or indicate the DPI to return the first packet to the distribution gateway through the SDN controller.

7. The method as claimed in claim 1, wherein in a case where the terminal initiates an application of a second type:

sending, by the SDN controller, an acquired distribution rule and processing rule to the DPI;

detecting, by the DPI, an acquired negotiation signalling to acquire the data flow description information, deciding whether the application needs the distribution according to the distribution rule, when it is decided that the application needs the distribution, performing, by the DPI or other functional nodes, NAT processing on a data packet used by the negotiation signalling according to the processing rule; and receiving, by the SDN controller, the data flow description information sent by the DPI, and delivering the distribution rule flow table to the distribution gateway according to the data flow description information;

wherein the application of the second type is an application of which the application type is able to be detected by detecting the first packet but the quintuple information is not able to be acquired by detecting the first packet.

8. The method as claimed in claim 1, wherein in a case where the terminal initiates an application of a second type:

receiving, by the SDN controller, an application type sent by the DPI after the DPI detects a negotiation signalling and acquires the application type;

deciding, by the SDN controller, whether distribution is needed according to the application type and the distribution strategy, and when it is decided that the distribution is needed, sending a processing rule for a data packet used by negotiation signalling to the DPI and/or a specific functional node;

performing, by the DPI or the specific functional node, NAT processing on the data packet used by the negotiation signalling according to the processing rule;

receiving, by the SDN controller, the data flow description information sent by the DPI after the DPI performs further detection on the data packet used by the negotiation signalling; and delivering, by the SDN controller, the distribution rule flow table to the distribution gateway according to the data flow description information;

wherein the application of the second type is an application of which the application type is able to be detected by detecting the first packet but the quintuple information is not able to be acquired by detecting the first packet.

9. The method as claimed in claim 1, wherein in a case where the terminal initiates an application of a second type:

sending, by the SDN controller, the data flow table to the mobile network gateway or the distribution gateway;

after performing backup caching or not performing backup caching on the first packet according to the data flow table, sending, by the distribution gateway or the mobile network gateway, the first packet to the SDN controller and then to the DPI; or performing backup caching or not performing backup caching on the first packet and then directly sending the first packet to the DPI;

detecting, by the SDN controller, an application type of the first packet locally to acquire the application type, or notifying the DPI to detect the application type of the first packet and acquiring the application type detected by the DPI, or acquiring, by the DPI, the first packet of the data from the distribution gateway or the mobile network gateway, and then detecting the application type and reporting the acquired application type to the SDN controller;

deciding, by the SDN controller, whether the application needs the distribution according to the application type and the acquired distribution strategy, and when it is decided that the application needs the distribution, notifying the mobile network gateway or the distribution gateway to send the data packet used by the negotiation signalling for subsequent detection to the DPI for detection;

receiving, by the SDN controller, the data flow description information from the DPI, wherein the DPI detects the data packet used by the subsequent negotiation signalling, acquires corresponding data flow description information, performs NAT processing on the data packet used by the subsequent negotiation signalling, and sends the data flow description information to the SDN controller; and delivering, by the SDN controller, the distribution rule flow table to the distribution gateway according to the data flow description information and the distribution strategy;

wherein the application of the second type is an application of which the application type is able to be detected by detecting the first packet but the quintuple information is not able to be acquired by detecting the first packet.

10. The method as claimed in claim 1, wherein in a case where the terminal initiates an application of a third type:

after the DPI collects statistics on the received data flow and acquires the data flow description information, receiving, by the SDN controller, the data flow description information sent by the DPI; and generating, by the SDN controller, a distribution rule flow table according to the data flow description information and the distribution strategy, and delivering the distribution rule flow table to the distribution gateway;

the application of the third type is an application of which the corresponding quintuple information and application type are able to be acquired by the DPI by performing statistical analysis on the data flow and the data flow will not be refused by a receiver even though the distribution gateway changes the source address information of the data flow in a process of delivering the data flow.

11. A controller, comprising:

an acquisition component, configured to acquire data flow description information of a data flow; and a processing component, configured to decide, according to the data flow description information, whether the data flow needs a distribution, and when the data flow needs the distribution, deliver a distribution rule flow table to a distribution gateway, wherein the acquisition component is further configured to send a data flow table to a mobile network gateway and/or a distribution gateway before acquiring the data flow description information of the data flow, wherein the data flow table is used for indicating the mobile network gateway or the distribution gateway to send a data flow of a corresponding terminal, which needs to be detected, to a Deep Packet Inspection (DPI) function for detection;

wherein the acquisition component is further configured to acquire the data flow description information of the data flow from the DPI; or, the mobile network gateway comprises one of: a user plane function of a SGW, a user plane function of a PGW, a user plane function of a SGSN, a user plane function of a GGSN or a user plane function of a non-3GPP gateway; or, the DPI is located at a data centre or located at a Traffic Detection Function (TDF).

12. The controller as claimed in claim 11, wherein the data flow description information comprises at least one of: an application type of the data flow and quintuple information of the data flow.

13. The controller as claimed in claim 11, wherein the processing component is further configured to acquire a distribution strategy locally or from a strategy server, decide, according to the data flow description information and the distribution strategy, whether the data flow corresponding to the data flow description information needs the distribution, and when it is decided that the data flow needs the distribution, generate the distribution rule flow table and delivering the distribution rule flow table to the distribution gateway.

14. The controller as claimed in claim 11, wherein in a case where a terminal initiates an application of a first type:

the receiving component is further configured to receive an application type and quintuple information, wherein the application type and the quintuple information are sent by the DPI after the DPI receives and detects the first packet of negotiation; and the processing component is further configured to decide whether the data flow needs the distribution according to the application type, the quintuple information and a distribution strategy, and when it is decided that the data flow needs the distribution, generate the distribution rule flow table and deliver the distribution rule flow table to the distribution gateway, wherein the data flow comprises: the first packet, one or more data packets used by subsequent negotiation signalling and one or more pure data packets after application layer negotiation is completed;

wherein the application of the first type is an application of which the application type and the quintuple information are able to be acquired by detecting the first packet.

15. The controller as claimed in claim 11, wherein in a case where a terminal initiates an application of a second type:

the processing component is further configured to send an acquired distribution rule and processing rule to the DPI;

the receiving component is further configured to, after the DPI detects an acquired negotiation signalling, acquires the data flow description information and decides whether the application needs the distribution according to the distribution rule, and the DPI or other functional nodes perform NAT processing on a data packet used by the negotiation signalling according to the processing rule when it is decided that the application needs the distribution, receive the data flow description information sent by the DPI; and the processing component is further configured to deliver the distribution rule flow table to the distribution gateway according to the data flow description information;

wherein the application of the second type is an application of which the application type is able to be detected by detecting the first packet but the quintuple information is not able to be acquired by detecting the first packet.

16. The controller as claimed in claim 11, wherein in a case where a terminal initiates an application of a second type:

the receiving component is further configured to receive an application type sent by the DPI after the DPI detects a negotiation signalling and acquires the application type;

the processing component is further configured to decide whether distribution is needed according to the application type and the distribution strategy, and when it is decided that the distribution is needed, send a processing rule for a data packet used by negotiation signalling to the DPI and/or a specific functional node;

the receiving component is further configured to, after the DPI or the specific functional node performs NAT processing on the data packet used by the negotiation signalling according to the processing rule, and the DPI performs further detection on the data packet used by the negotiation signalling, receive the data flow description information sent by the DPI; and the processing component is further configured to deliver the distribution rule flow table to the distribution gateway according to the data flow description information;

wherein the application of the second type is an application of which the application type is able to be detected by detecting the first packet but the quintuple information is not able to be acquired by detecting the first packet.

17. The controller as claimed in claim 11, wherein in a case where a terminal initiates an application of a second type:
- the processing component is further configured to send the data flow table to the mobile network gateway or the distribution gateway;
- the processing component is further configured to, after the distribution gateway or the mobile network gateway performs backup caching or does not perform backup caching on the first packet according to the data flow table and then sends the first packet to the SDN controller and then to the DPI, or performs backup caching or does not perform backup caching on the first packet and then directly sends the first packet to the DPI, detect an application type of the first packet locally to acquire the application type, or notify the DPI to detect the application type of the first packet and acquire the application type detected by the DPI, or acquire the application type acquired after the DPI acquires the first packet of the data from the distribution gateway or the mobile network gateway and detects the application type;
- the processing component is further configured to decide whether the application needs the distribution according to the application type and the acquired distribution strategy, and when it is decided that the application needs the distribution, notify the mobile network gateway or the distribution gateway to send the data packet used by the negotiation signalling for subsequent detection to the DPI for detection;
- the receiving component is further configured to receive the data flow description information from the DPI, wherein the DPI detects the data packet used by the subsequent negotiation signalling, acquires corresponding data flow description information, performs NAT processing on the data packet used by the subsequent negotiation signalling, and sends the data flow description information to the SDN controller; and
- the processing component is further configured to deliver the distribution rule flow table to the distribution gateway according to the data flow description information and the distribution strategy;
- wherein the application of the second type is an application of which the application type is able to be detected by detecting the first packet but the quintuple information is not able to be acquired by detecting the first packet.

18. The controller as claimed in claim 11, wherein in a case where a terminal initiates an application of a third type:
- the receiving component is further configured to receive the data flow description information sent by the DPI after the DPI collects statistics on the received data flow and acquires the data flow description information; and
- the processing component is further configured to generate a distribution rule flow table according to the data flow description information and the distribution strategy, and deliver the distribution rule flow table to the distribution gateway; and
- the application of the third type is an application of which the corresponding quintuple information and application type are able to be acquired by the DPI by performing statistical analysis on the data flow and the data flow will not be refused by a receiver even though the distribution gateway changes the source address information of the data flow in a process of delivering the data flow.

* * * * *